United States Patent
Thouvenel et al.

(10) Patent No.: US 7,930,876 B2
(45) Date of Patent: Apr. 26, 2011

(54) METHOD AND DEVICE FOR MONITORING A PARTICLE FILTER IN THE EXHAUST LINE OF AN INTERNAL COMBUSTION ENGINE

(75) Inventors: Nicolas Thouvenel, Ballancourt sur Essone (FR); Laurent Leprieur, Limours (FR)

(73) Assignee: Renault S.A.S., Boulogne Billancourt (FR)

( * ) Notice: Subject to any disclaimer, the term of this patent is extended or adjusted under 35 U.S.C. 154(b) by 702 days.

(21) Appl. No.: 11/909,010

(22) PCT Filed: Mar. 20, 2006

(86) PCT No.: PCT/FR2006/000633
§ 371 (c)(1),
(2), (4) Date: Feb. 13, 2008

(87) PCT Pub. No.: WO2006/097646
PCT Pub. Date: Sep. 21, 2006

(65) Prior Publication Data
US 2009/0229252 A1 Sep. 17, 2009

(30) Foreign Application Priority Data
Mar. 18, 2005 (FR) ..................................... 05 50709

(51) Int. Cl.
*F01N 3/00* (2006.01)
(52) U.S. Cl. ................. 60/277; 60/274; 60/276; 60/285; 60/290
(58) Field of Classification Search .................... 60/274, 60/284–287, 267, 277, 290
See application file for complete search history.

(56) References Cited

U.S. PATENT DOCUMENTS

| 5,133,184 | A | | 7/1992 | Geiger et al. | |
|---|---|---|---|---|---|
| 5,191,762 | A | * | 3/1993 | Kuroda et al. | 60/276 |
| 5,444,974 | A | | 8/1995 | Beck et al. | |
| 5,672,817 | A | * | 9/1997 | Sagisaka et al. | 73/114.72 |
| 5,724,809 | A | * | 3/1998 | Mitsutani et al. | 60/276 |
| 6,604,357 | B2 | * | 8/2003 | Bradley et al. | 60/276 |
| 7,281,369 | B2 | * | 10/2007 | Emi et al. | 60/297 |
| 7,600,374 | B2 | * | 10/2009 | Ueno | 60/295 |
| 2004/0123586 | A1 | | 7/2004 | Kuboshima et al. | |
| 2008/0041035 | A1 | * | 2/2008 | Sawada et al. | 60/277 |

FOREIGN PATENT DOCUMENTS

DE 102 28 659 1/2004

OTHER PUBLICATIONS

U.S. Appl. No. 12/067,311, filed Mar. 19, 2008, Ploton, et al.

* cited by examiner

*Primary Examiner* — Binh Q Tran
*Assistant Examiner* — Jesse Bogue
(74) *Attorney, Agent, or Firm* — Oblon, Spivak, McClelland, Maier & Neustadt, L.L.P.

(57) ABSTRACT

A device for monitoring an operating mode of an element used for aftertreatment of exhaust gases from an internal combustion engine and to an associated method. The device includes a controller configured to receive a signal that represents a characteristic magnitude of the exhaust gases downstream of the exhaust gas aftertreatment element. In addition, the controller can receive a signal that represents engine deceleration and is configured to increment a deceleration counter with each deceleration. The controller also includes a failure counter that is incremented when a variation in the above-mentioned measured magnitude is detected during a deceleration, the controller establishing a diagnostic criterion that is a function of the two counters. The controller triggers a fault signal if the diagnostic criterion exceeds programmed limits.

10 Claims, 2 Drawing Sheets

Figure 1:
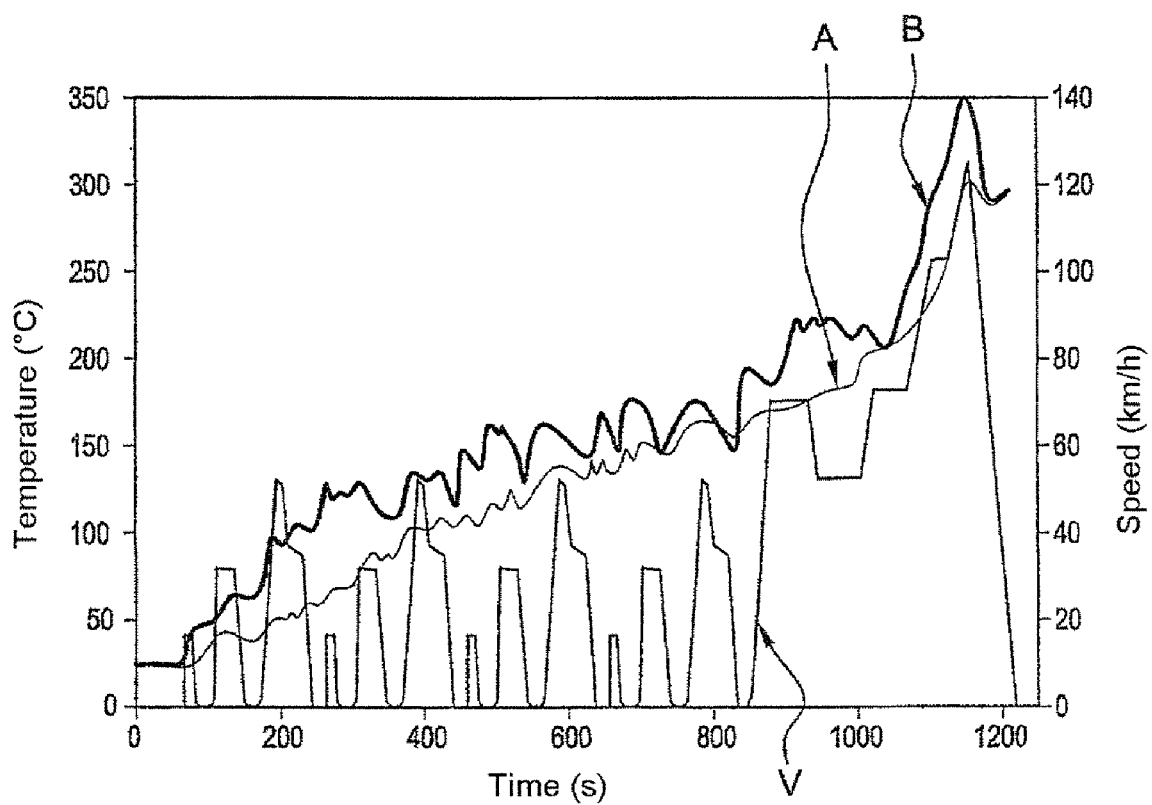

METHOD AND DEVICE FOR MONITORING A PARTICLE FILTER IN THE EXHAUST LINE OF AN INTERNAL COMBUSTION ENGINE

The present invention pertains to the field of pollution removal devices placed in the exhaust line of motor vehicle internal combustion engines, and relates more particularly to a method and an onboard diagnostic device for monitoring a particulate filter placed in the exhaust pipework of such an internal combustion engine.

The presence of a particulate filter in an exhaust line of an engine of an internal combustion engine, in particular of a diesel engine, makes it possible to considerably decrease the quantity of particles, dust and other soot emitted into the atmosphere so as in particular to meet regulatory requirements such as antipollution standards.

Such particulate filters may experience more or less significant degradations, and this may decrease their performance. Thus devices and methods have been developed to accurately monitor the performance of such filters and thus make it possible to monitor whether they are damaged or in a functional state.

From the prior art such as document EP1425498 or else document FR2836957, are proposed devices and methods making it possible to diagnose the operating mode of the particulate filter. This often consists in using information relating to the differential pressure measured across a particulate filter or for example in the measurement of various characteristic quantities upstream and downstream of the said particulate filter. These are for example the variation in the temperature of a known surface as a function of the quantity of particles accumulated and of the heat capacity of the trapped particles, or the variation in the electrical capacity of the exhaust gases as a function of the quantity of particles present.

However, such methods require the installation of often expensive sensors. Moreover, it is becoming increasingly difficult to monitor, by measuring the pressure, the operating mode of a new generation of catalytic or non-catalytic porous particulate filter. Specifically, the presence of such dust filters in the exhaust line induces hardly any pressure variation thus not making it possible to correctly monitor the state of the particulate filter, the diagnostic being less reliable.

From document DE 10228659, there is proposed a method of monitoring a motor vehicle exhaust gas discharge system. Temperature curves are measured upstream and downstream of a part of the exhaust gas pipe. Comparison and processing of these measurements attempt to perform a diagnostic of the operation of a particulate filter. This document specifies that the measured curves correspond to measurements performed when the engine passes from a high load state to a low load state and vice versa. A problem with this proposal is that it uses two sensors to do the analysis, and the sensors disposed in an exhaust line have a high per-item cost.

The aim of the invention is to propose an improved onboard device and diagnostic method for monitoring a particulate filter in the pipework of such an internal combustion engine.

With this aim, the subject of the invention is a method of monitoring the operating mode of an internal combustion engine exhaust gas post-treatment element comprising the following steps:

a) measuring a quantity characteristic of the exhaust gases downstream of the said exhaust gas post-treatment element;

b) determining the decelerations of the engine and incrementing a deceleration counter during each deceleration;

c) incrementing a defect counter when a variation in the said quantity measured in step (a) is detected during a deceleration;

d) establishing a diagnostic criterion dependent on the two counters; and e) triggering a fault signal if the diagnostic criterion exceeds preprogrammed limits.

One of the advantages of the present invention is that only a single sensor is used in the exhaust line, the second speed sensor being a sensor that is already present for engine control.

According to other characteristics of the invention:

the diagnostic criterion is established in the form of a sliding average obtained over a number of decelerations.

the sliding average is calculated throughout a trip over a repetition of a number of decelerations.

the diagnostic criterion is established by dividing the instantaneous value of the defect counter by the instantaneous value of the deceleration counter.

the average diagnostic criterion is compared with the preprogrammed limits in the form of a threshold criterion, for example a threshold criterion determined with a statistical approach based on compliance with a false detection rate and with a non-detection rate.

the said quantity is measured using a single temperature sensor disposed downstream of the said exhaust gas post-treatment element.

the defect counter is incremented when a decrease is detected in the temperature of the exhaust gases.

The subject of the invention is also a device for monitoring the operating mode of an internal combustion engine exhaust gas post-treatment element, comprising a controller able to receive a signal representing a quantity characteristic of the exhaust gases downstream of the said exhaust gas post-treatment element, characterized in that the said controller is able to receive a signal representing the decelerations of the engine and is suitable for incrementing a deceleration counter during each deceleration, moreover comprising a defect counter incremented when a variation in the said measured quantity is detected during a deceleration and in that the said controller establishes a diagnostic criterion dependent on the two counters and triggers a fault signal if the diagnostic criterion exceeds preprogrammed limits.

According to other characteristics of the invention:

the said treatment element is a particulate filter.

the said measured quantity represents the temperature of the exhaust gases downstream of said exhaust gas post-treatment element.

Figure 2:
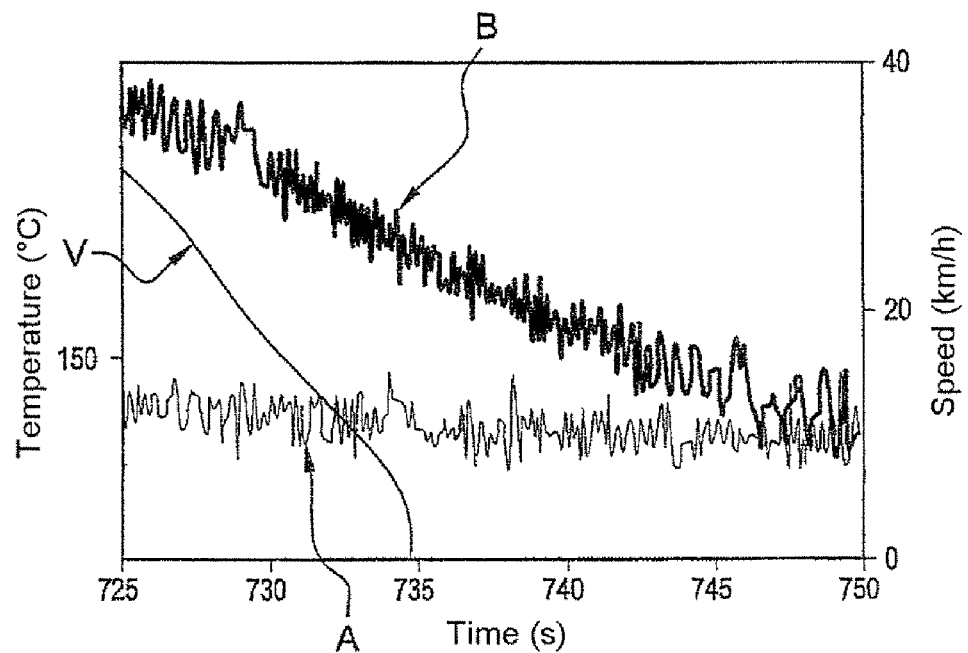

The invention will be better understood through the description hereinafter of an embodiment given by way of nonlimiting example with reference to the appended drawings, in which:

FIG. 1 represents various thermal profiles measured at a point of the exhaust line that is situated downstream of a particulate filter when the particulate filter is present and is operating normally, and when it is absent or highly damaged FIG. 2 presents a detail of the evolution of the quantities presented in FIG. 1

Figure 3:
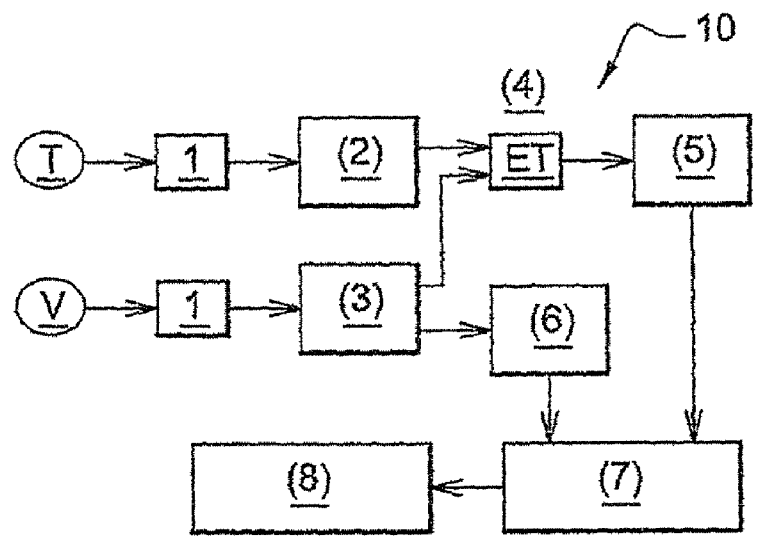
Figure 4:
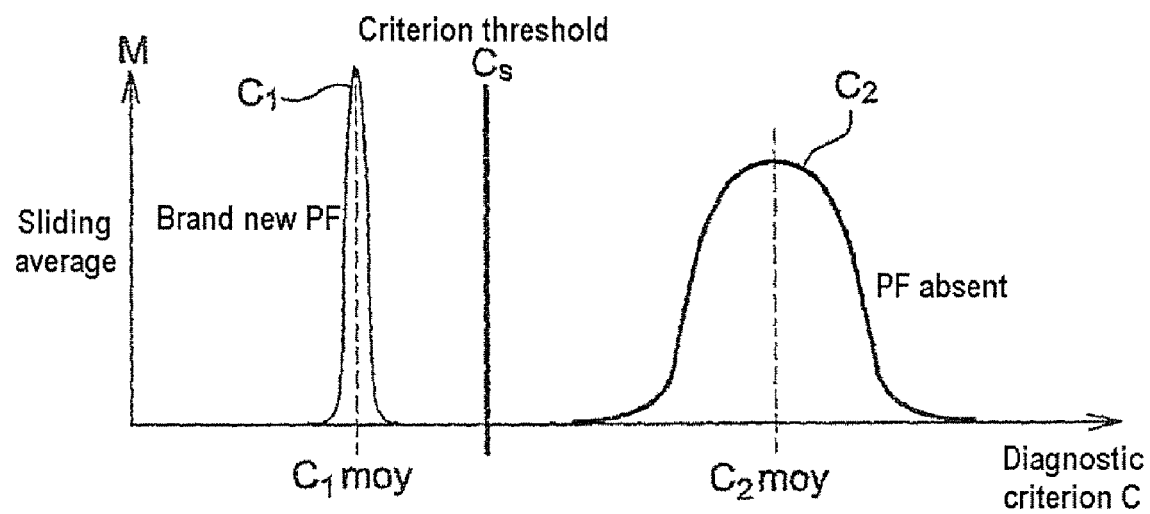

FIG. 3 represents a flowchart illustrating the operation of the method according to the invention FIG. 4 represents the distribution shape of the sliding averages as a function of a diagnostic criterion In FIG. 1, curves A and B present the variations in the temperature measured downstream of a particulate filter, made of silicon carbide for example, at a point of the exhaust line of a combustion engine as a function of time. Curves A and B are established during a standardized operating cycle of the internal combustion engine, intended to evaluate the polluting behaviour of the said engine during several acceleration and deceleration cycles.

Curve A is for example measured on a vehicle having a brand new particulate filter, while curve B is measured on a vehicle having a particulate filter replaced with a simple tube, thus simulating the absence of the particulate filter or a highly damaged particulate filter, perforated for example. Curve V represents the speed of the vehicle during this cycle.

The charted thermal profiles are substantially different depending on whether the particulate filter is present and functional or depending on whether the particulate filter is absent or highly damaged. By magnifying a part of FIG. 1 during a deceleration of the engine, the thermal profile retrieved over a pollution removal cycle by a vehicle without particulate filter or with a damaged particulate filter, exhibits a slope substantially greater, in absolute value, than that of the thermal profile recorded when the particulate filter is operating correctly.

The slope of the temperature curve observed for a correctly operating particulate filter is substantially small, or indeed substantially zero. Specifically, on a deceleration of the engine, a particulate filter, which is operating correctly, does not retrieve any or retrieves very little of the heat stored up on a deceleration, while a simple tube or a highly damaged particulate filter has no impact on the discharging of the bursts of heat. During a deceleration, the temperature downstream, and upstream of the particulate filter, decreases. Thus the derivative of a thermal signal measured at a point of the exhaust line situated downstream of a particulate filter may constitute an indicator that can advise regarding the operating mode of the particulate filter.

Represented in FIG. 3 is a controller 10 for monitoring the operating mode of an exhaust gas post-treatment element, such as a particulate filter, which comprises filtering means 1, a module for detecting a thermal loss 2 making it possible to detect a drop in the temperature measured downstream of the particulate filter, a module 3 for detecting a deceleration making it possible to detect a decrease in the speed of the vehicle, a logical operator 4 of AND type permitting the two conditions of thermal drop and of deceleration of the detection modules 2, 3 to hold jointly.

The controller 10 for monitoring the particulate filter also comprises a defect counter 5, a decelerations counter 6.

A diagnostic criterion C is defined as being the ratio between the value of the defect counter 5 and the value of the decelerations counter 6. Preferably, the values of the counters are instantaneous values.

The controller 10 for monitoring the particulate filter also comprises a module 7 for calculating the diagnostic criterion C making it possible to calculate the criterion the diagnostic criterion.

A sliding average M of the values of the said diagnostic criterion C is then established over a previously determined number of decelerations by an average calculation module 8. In this way, a diagnostic criterion is established in the form of a sliding average M obtained over a number of deceleration in accordance with statistical bases.

This sliding average M is calculated throughout a trip over a repetition of a defined number of decelerations.

The method of monitoring the particulate filter according to the invention is established on the basis of the measurement of a characteristic quantity, such as the temperature downstream of the particulate filter, and on the basis of the measurement of the speed of the vehicle.

The first step of the method therefore consists in measuring at each instant t by way of simple sensors, the temperature downstream of the particulate filter disposed at a point of the exhaust line and the speed of the vehicle. The respectively generated signals of the temperature and of the speed, are thereafter filtered.

Once these signals have been filtered by filtering means 1, a step then consists in detecting the temperature drops when the vehicle decelerates.

For this purpose, when a deceleration of the vehicle is detected by way of a deceleration detection module 3, a first deceleration counter 6 is incremented.

The detection of a deceleration is effected by way of a deceleration detection module 3. This deceleration detection module 3 receives as input the filtered signal of the speed V of the measured vehicle. This deceleration detection module 3, such as a comparator for example, makes it possible to compare the amplitude of the signal of the speed $|V_t|$ measured at an instant t with the amplitude of the speed measured and recorded in a memory for example at the previous time $|V_{t-1}|$. The detection module 3 outputs a deceleration detection signal for example of amplitude substantially equal to 1 or 0 if a deceleration is or is not detected.

The output signal from the deceleration detection module 3 then makes it possible to trigger the operation of the deceleration counter 6 which is therefore incremented during a deceleration of the vehicle, that is to say when the speed at the time t is substantially less than the speed measured at the time t−1.

Likewise, the detection of a decrease in the temperature is effected by way of a module for detecting a thermal loss 2. The module for detecting a thermal loss 2 receives as input the filtered signal of the temperature measured downstream of the particulate filter. The thermal loss detection module 2, such as a comparator for example, makes it possible to compare the amplitude of the signal of the temperature measured at an instant t $|T_t|$ with the amplitude of the temperature measured and recorded in a memory for example at the previous time $|T_{t-1}|$, and outputs a signal detecting a thermal loss for example of amplitude substantially equal to 1 or 0 if a decrease in the temperature has or has not been detected.

Parallel to the step of incrementing the first deceleration counter 6, when a decrease in the temperature measured downstream is detected by way of a module for detecting a thermal drop 2, and when a deceleration is detected, a second defect counter 5 is also incremented. For this purpose, a logical operator 4, such as an AND logical operator, receiving as input the deceleration detection signal and the signal detecting a thermal loss outputs a signal of amplitude substantially equal to 1 when the two detection conditions hold jointly, that is to say when for example the amplitude of the deceleration detection signal and the amplitude of the signal detecting a thermal loss are substantially equal to 1.

Once these steps have been performed, a diagnostic criterion C calculation module 7, such as a divider for example, receives as input the output signal from the deceleration counter 6 and the output signal from the defect counter 5. The amplitudes of these output signals represent respectively the number of decelerations and the number of times that there has been a variation in the measured quantity characteristic of the gases. In this case and preferably, the variation to be detected is a thermal drop in the course of a deceleration. The diagnostic criterion C calculation module 7 therefore generates as output the signal whose amplitude represents the ratio between the amplitude of the signal representing the number of decelerations and the amplitude of the signal representing the number of times that there has been a thermal drop in the course of a deceleration. It would be possible to consider other quantities characteristic of the exhaust gases such as the pressure.

When the diagnostic criterion C is established, a following step consists in determining a sliding average M of the diagnostic criterion C. On the basis of the output signal from the module 7 for calculating the diagnostic criterion C, an average calculation module 8 outputs a signal whose amplitude represents the sliding average M of the amplitudes of the signal of the diagnostic criterion C over a previously determined number of decelerations.

Represented in FIG. 4 are the general shape and the dispersion of the values of the said sliding average as a function of the said measurement criterion C for extreme cases of the state of a particulate filter. Curve C1 represents for example the sliding average of the diagnostic criterion C as a function of the said criterion of the diagnostic C for a brand new particulate filter. Curve C2 represents the sliding average of the criterion of the diagnostic C when there is no particulate filter. Curves C1 and C2 make it possible to calibrate the monitoring device.

The values of the sliding average M of curve C1 are organized about an average value C1$moy$ of the diagnostic criterion C with a low dispersion about the said average value C1$moy$.

When the particulate filter is absent, the values of the sliding average M are organized about an average value C2$moy$ of the diagnostic criterion C that is substantially above the average value C1$moy$. Moreover, the dispersion of the values of the sliding average M about the average value C2$moy$ is much greater than when the particulate filter is brand new in the exhaust line. Curves C1 and C2 for a brand new particulate filter and an absent particulate filter, do not overlap.

Preprogrammed limits such as a threshold criterion Cs then are calibrated in the controller 10. The threshold criterion Cs can for example be determined on the basis of the curves C1 and C2 obtained for a brand new particulate filter and for an absent particulate filter with a statistical approach based on compliance with a false detection rate and with a non-detection rate.

On the basis of the signal whose amplitude represents the sliding average M, a following step consists in generating the signal whose amplitude is substantially equal to the average diagnostic criterion Cmoy. If the amplitude of the signal of average diagnostic criterion Cmoy is substantially less than the threshold criterion Cs, the sliding average M of the diagnostic criterion C being organized according to a curve substantially analogous to curve C1, then the particulate filter is present and functional in the exhaust line of the internal combustion engine.

On the other hand a damaged particulate filter in the exhaust line of the internal combustion engine exhibits a sliding average M of a diagnostic criterion C organized according to a curve substantially analogous to curve C2, about an average measurement criterion Cmoy, substantially greater than the threshold criterion Cs. Overshoot of the threshold criterion Cs then triggers a fault signal visible by the driver of the vehicle, urging him to undertake maintenance of his vehicle.

In a preferred embodiment of the invention, the processing of the temperature values measured downstream of the particulate filter is ensured, but in a non-exclusive manner by an appropriate computer, such as the computer for managing and controlling the operation of the internal combustion engine.

The method according to the invention thus affords a simple and reliable diagnostic of the presence of a particulate filter in the exhaust line of the internal combustion engine of a motor vehicle. Furthermore, this method, based on a simple temperature measurement downstream of the particulate filter, is applicable to any type of particulate filter, including the latest generation highly porous particulate filters. Moreover the method, requiring the simple fitting of a single temperature sensor downstream of the particulate filter, the implementation of the device and of the associated method is then inexpensive. Specifically the calculational load corresponding to the processing of the measured temperature values being hardly significant and hardly being a burden on the calculational load of a device for managing and monitoring the operation of the internal combustion engine.

The invention claimed is:

1. A method for monitoring an operating mode of an internal combustion engine exhaust gas post-treatment element, comprising:
    a) measuring a quantity characteristic of exhaust gases downstream of the exhaust gas post-treatment element;
    b) determining decelerations of the engine and incrementing a deceleration counter during each deceleration;
    c) incrementing a defect counter when a variation in the quantity measured in the measuring (a) is detected during a deceleration;
    d) establishing a diagnostic criterion dependent on the deceleration and defect counters; and
    e) triggering a fault signal if the diagnostic criterion exceeds preprogrammed limits.

2. A monitoring method according to claim 1, wherein the diagnostic criterion is established in a form of a sliding average obtained over a number of decelerations.

3. A monitoring method according to claim 2, wherein the sliding average is calculated throughout a trip over a repetition of a number of decelerations.

4. A monitoring method according to claim 1, wherein the diagnostic criterion is established by dividing a value of the defect counter by a value of the deceleration counter.

5. A monitoring method according to claim 1, wherein the average diagnostic criterion is compared with preprogrammed limits in a form of a threshold criterion, or a threshold criterion determined with a statistical approach based on compliance with a false detection rate and with a non-detection rate.

6. A monitoring method according to claim 1, wherein the quantity is measured using a single temperature sensor disposed downstream of the exhaust gas post-treatment element.

7. A monitoring method according to claim 1, wherein the defect counter is incremented when a decrease is detected in the temperature of the exhaust gases.

8. A device for monitoring an operating mode of an internal combustion engine exhaust gas post-treatment element, comprising:
    a controller configured to receive a signal representing a quantity characteristic of exhaust gases downstream of the exhaust gas post-treatment element, wherein the controller is configured to receive a signal representing decelerations of the engine and is configured to increment a deceleration counter during each deceleration; and
    a defect counter incremented when a variation in the measured quantity is detected during a deceleration, and wherein the controller establishes a diagnostic criterion dependent on the deceleration and defect counters and triggers a fault signal if the diagnostic criterion exceeds the preprogrammed limits.

9. A monitoring device according to claim 8, wherein the treatment element is a particulate filter.

10. A monitoring device according to claim 8, wherein the measured quantity represents the temperature of the exhaust gases downstream of the exhaust gas post-treatment element.

* * * * *